(12) United States Patent
Kim et al.

(10) Patent No.: US 8,106,551 B2
(45) Date of Patent: Jan. 31, 2012

(54) DIRECT DRIVE MOTOR FOR VEHICLE WIPER SYSTEM

(75) Inventors: Hyun Sub Kim, Seoul (KR); Yang Gi Lee, Hwaseong-si (KR); Hyeon Jo, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 691 days.

(21) Appl. No.: 12/260,942

(22) Filed: Oct. 29, 2008

(65) Prior Publication Data

US 2009/0284090 A1 Nov. 19, 2009

(30) Foreign Application Priority Data

May 15, 2008 (KR) .................. 10-2008-0044827

(51) Int. Cl.
*H02K 7/10* (2006.01)

(52) U.S. Cl. ........................................ 310/75 R; 310/78

(58) Field of Classification Search ............ 310/75 R, 310/78; 192/69.81, 84.6, 84, 8
See application file for complete search history.

(56) References Cited

U.S. PATENT DOCUMENTS

| 1,948,037 | A | * | 2/1934 | Kingston | 477/14 |
| 5,600,191 | A | * | 2/1997 | Yang | 310/67 R |
| 6,388,348 | B2 | * | 5/2002 | van Heyden et al. | 310/74 |

FOREIGN PATENT DOCUMENTS

| JP | 59-145647 A | 8/1984 |
| JP | 11-301414 A | 11/1999 |
| JP | 2006-51834 A | 2/2006 |
| KR | 1997-0059362 A | 8/1997 |

* cited by examiner

*Primary Examiner* — Quyen Leung
*Assistant Examiner* — Leda Pham
(74) *Attorney, Agent, or Firm* — Morgan, Lewis & Bockius LLP

(57) ABSTRACT

A direct drive motor for a vehicle wiper system, which drives a wiper arm directly connected to a motor shaft may include a rotor for generating a rotational force, in which a sun gear connected to an upper portion of the rotor transmits the rotational force to a power transmission portion, a locking portion mounted on an upper inner surface of the rotor; and a clutch engaged with the locking portion and preventing the rotor from moving.

15 Claims, 4 Drawing Sheets

<DURING STOPPING OF WIPER>

<DURING OPERATION OF WIPER>

DIRECT DRIVE MOTOR FOR VEHICLE WIPER SYSTEM

CROSS-REFERENCE TO RELATED APPLICATION

This application claims under 35 U.S.C. §119(a) the benefit of Korean Patent Application No. 10-2008-0044827 filed May 15, 2008, the entire contents of which are incorporated herein by reference.

BACKGROUND (a) Technical Field

The present invention relates to a direct drive motor for driving a wiper arm directly connected to a motor shaft. More particularly, the present invention relates to a direct drive motor for a vehicle wiper system, which includes a clutch for restricting the movement of the motor shaft.

(b) Background Art

Generally, drive sources mounted in a vehicle to drive a vehicle wiper include a general DC motor with a four-bar linkage structure and an electronically controlled DC motor with an improved cowl package.

The general DC motor has drawbacks in that, since a motor shaft is rotated 360°, a brush provided in the inside thereof is easily worn away, and its durability and noise, vibration and harshness (NVH) performance are deteriorated.

Moreover, the electronically controlled DC motor also has drawbacks in that its durability is deteriorated due to abrasion of a brush, although the abrasion is somewhat reduced since the motor shaft is rotated 180°.

According to the above-described conventional motors with the linkage power transmission mechanism, it is impossible to achieve a precise control due to the linkage operation by a simple mechanical mechanism and its efficiency is deteriorated due to loss by a lot of mechanical joints.

Contrarily, a direct drive motor in which a driving force of a motor shaft is directly connected to a drive unit has advantages in that, since rotational inertia is minimized by a low-speed motor, it is possible to achieve a precise control, and its efficiency is improved with a configuration in which mechanical joints are minimized.

Moreover, since the above direct drive motor is a brushless motor, its durability and noise, vibration and harshness (NVH) performance are improved.

However, the direct drive motor has a drawback in that, since it does not include a means for preventing the motor shaft from moving to forcibly fix the motor shaft, if an external force is applied to a wiper arm, a rotor is rotated and thus a wiper is moved.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, embodiments of the present invention provides a direct drive motor for a vehicle wiper system, which includes a clutch as a means for preventing the motor shaft from moving to be fixed.

In one aspect, the present invention provides a direct drive motor for a vehicle wiper system, that may include a rotor for generating a rotational force, in which a sun gear connected to an upper portion of the rotor, transmits the rotational force to a power transmission portion, the direct drive motor comprising: a locking portion mounted on an upper inner surface of the rotor; and a clutch selectively engaged with the locking portion and preventing the rotor from moving. The clutch may comprise: a housing including an opening formed on an upper portion thereof; a metal plate provided on the inside of the housing and moved up and down; a wire formed on the metal plate and providing a polarity; a magnet provided in the operational direction of the metal plate and generating a magnetic force; an inner housing slidably coupled to the housing, connected to the metal plate and operated integrally with the metal plate; and an actuator including a saw-toothed portion, provided on an upper portion thereof, engaged with the locking portion, and mounted on the inner housing to be operated integrally with the inner housing. The clutch may further comprise a hook mounted between the inner housing and the actuator and performing a hooking operation.

In an exemplary embodiment of the present invention, wherein the wire is connected to a printed circuit board for supplying electrical power of appropriate polarity through a terminal.

In another exemplary embodiment of the present invention, the clutch may be operated by a magnetic force generated by electrical power applied thereto to restrict the operation of the locking portion wherein the clutch comprises: a housing including an opening formed on an upper portion thereof; a metal plate provided on the inside of the housing and moved up and down; a wire formed on the metal plate and providing a polarity; a magnet provided in the operational direction of the metal plate and generating a magnetic force; an inner housing slidably coupled to the housing, connected to the metal plate and operated integrally with the metal plate; and an actuator including a saw-toothed portion, provided on an upper portion thereof, engaged with the locking portion, and mounted on the inner housing to be operated integrally with the inner housing. The clutch may further comprise a hook mounted between the inner housing and the actuator and performing a hooking operation. The wire may be connected to a printed circuit board for supplying electrical power of appropriate polarity through a terminal. At least one of the metal plate and the magnet may be formed with a cylindrical shape along the inner circumference of the housing.

In further another exemplary embodiment of the present invention, a direct drive motor for a vehicle wiper system, may comprise: a rotating portion for generating a rotational force of the motor; a locking portion mounted to the rotating portion; a fixing portion configured to be selectively engaged with the locking portion and restricting the operation of the rotating portion; and an electronic control portion selectively controlling the rotating portion and the fixing portion.

The rotation portion may comprise: a rotor for generating the rotational force of the motor; a magnet mounted on the inside of the rotor and generating a magnetic force; and an armature spaced from the magnet in a predetermined distance. A sun gear may be coaxially provided on an upper portion of the rotor. The locking portion may be mounted on an upper inner surface on the rotor.

The electronic control portion may include a printed circuit board (PCB) which supplies electrical power of appropriate polarity to the fixing portion through at least a terminal according to an external environment, i.e., an operation state of the wiper and/or supplies electrical power to the rotation portion. The fixing portion inserted into the armature, may comprise: a housing inserted into the armature, wherein the housing includes an opening formed on an upper portion thereof; an inner housing slidably inserted into the opening of the housing, wherein the inner housing is selectively moved up and down through an opening of the housing; a wire positioned between the housing and the inner housing and connected to at least a terminal and receiving electrical power from the electronic control portion to provide a polarity; a metal plate provided on the outer circumference of the inner housing and surrounded by the wire and selectively magnetized by receiving a polarity from the wire; a magnet disposed substantially at the bottom of the metal plate to cause an attractive or repulsive force therebetween; and an actuator provided on an upper portion of the inner housing. The actuator may include a saw-toothed portion configured to be selectively engaged with the locking portion. At least one of the metal plate and the magnet may be formed with a cylindrical shape along the inner circumference of the housing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
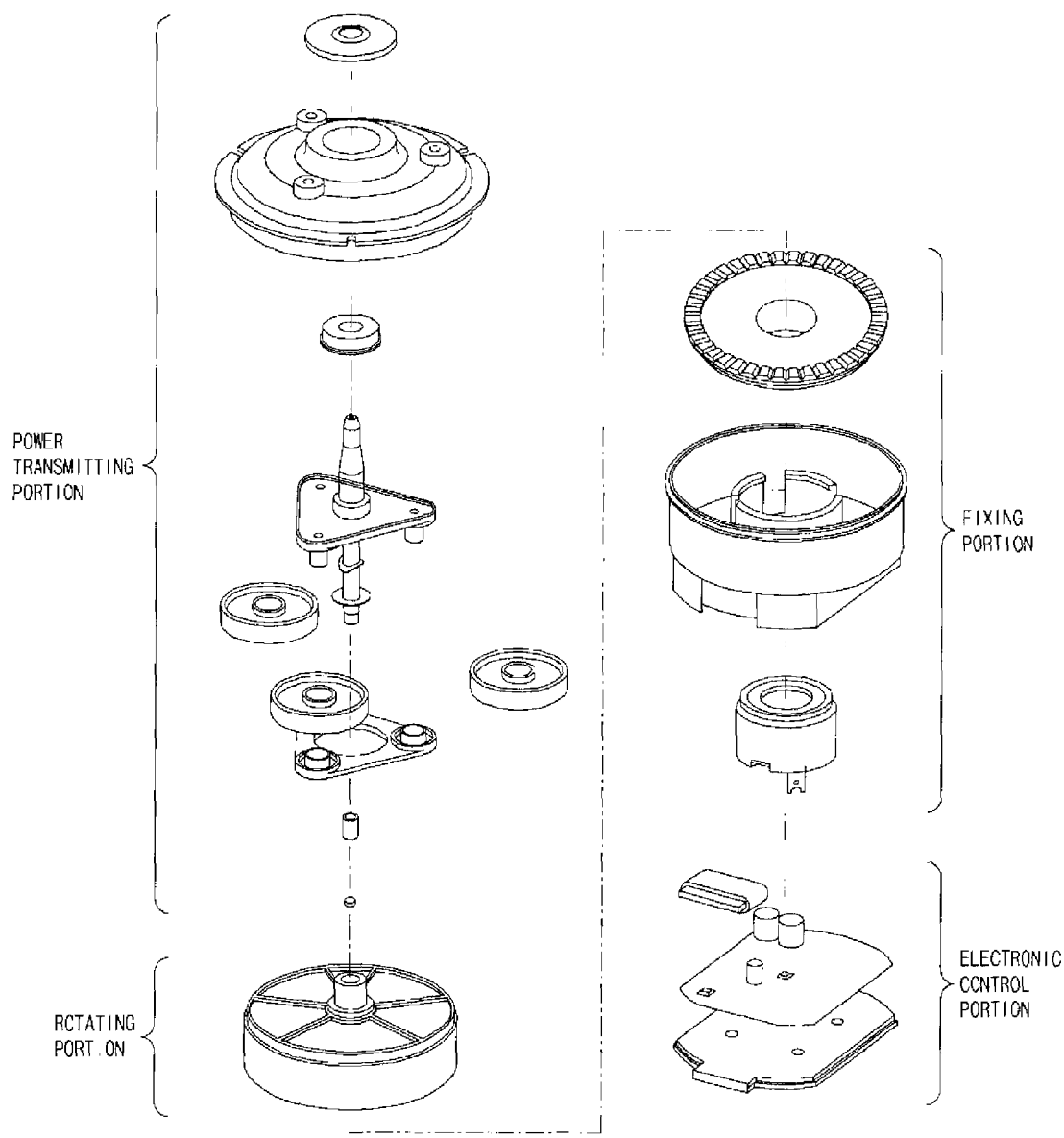
FIG. 1 is an exploded perspective view showing a direct drive motor including a fixing portion.

Reference numerals set forth in the Drawings includes reference to the following elements as further discussed below:

| | |
|---|---|
| 100: clutch | 110: actuator |
| 111: saw-toothed portion | 120: housing |
| 130: magnet | 140: wire |
| 150: metal plate | 160: inner housing |
| 170: hook | 200: rotor |
| 210: magnet | 220: armature |
| 230: locking portion | 240: sun gear |
| 300: PCB | 310: terminal |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
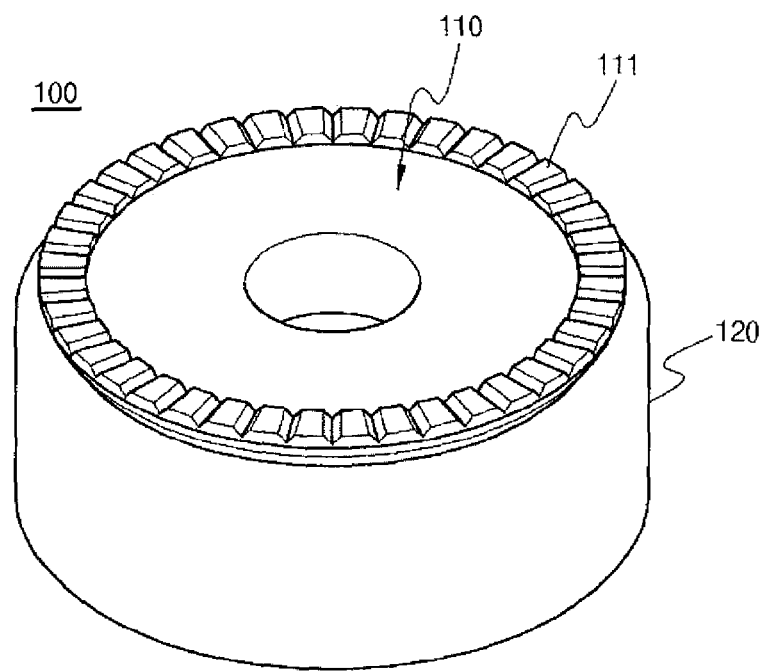
FIG. 3 is a perspective view showing an appearance of the clutch in accordance with the preferred embodiment of the present invention.
Figure 4:
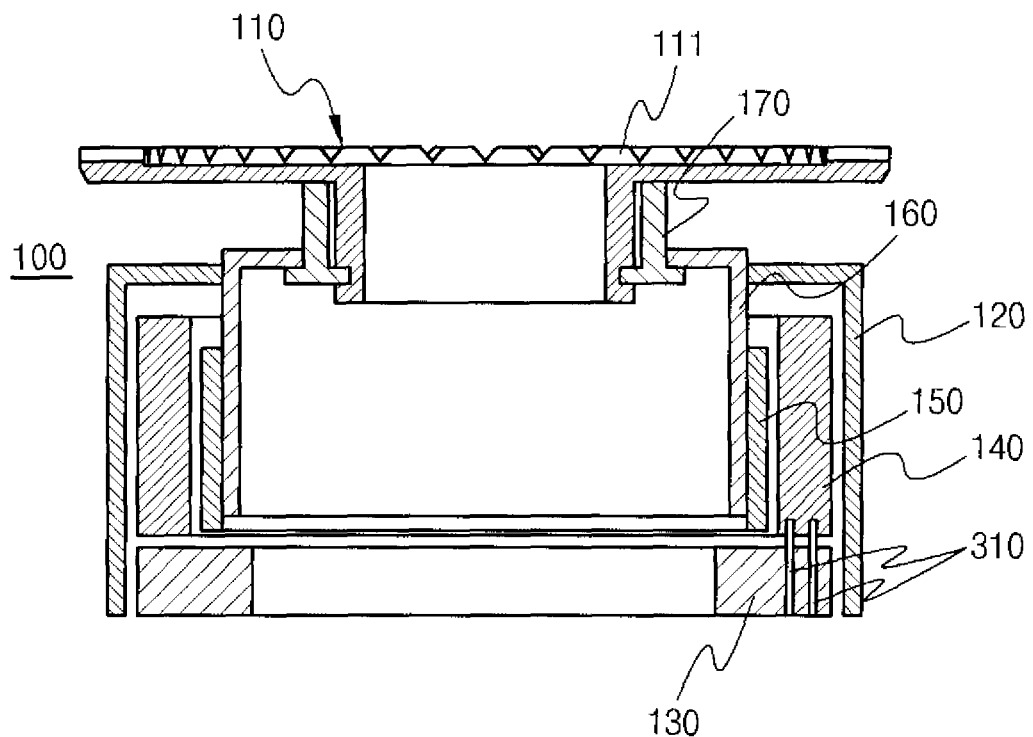
FIG. 4 is a cross-sectional view schematically showing the clutch in accordance with the preferred embodiment of the present invention.
Figure 5:
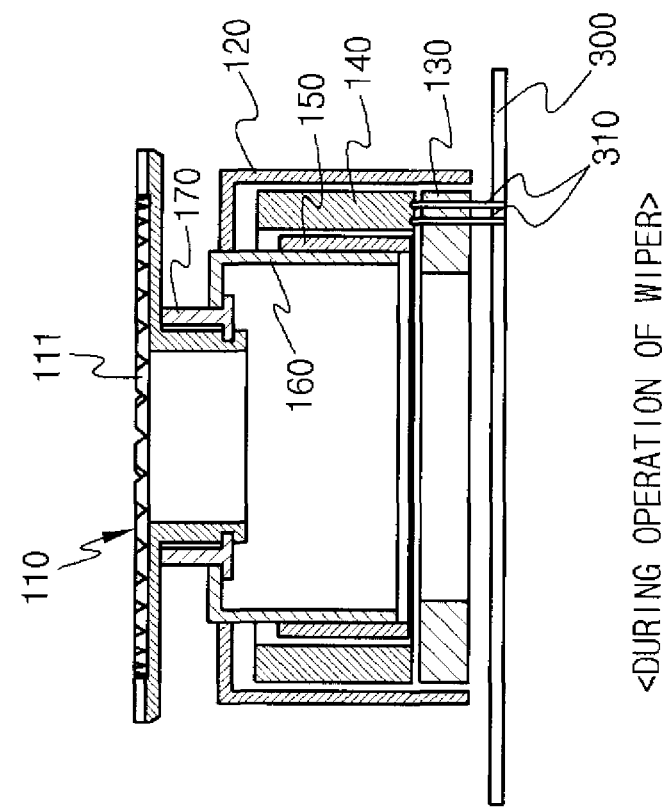
FIG. 5 is a cross-sectional view showing the operation of the clutch in accordance with the present invention.
Figure 5:
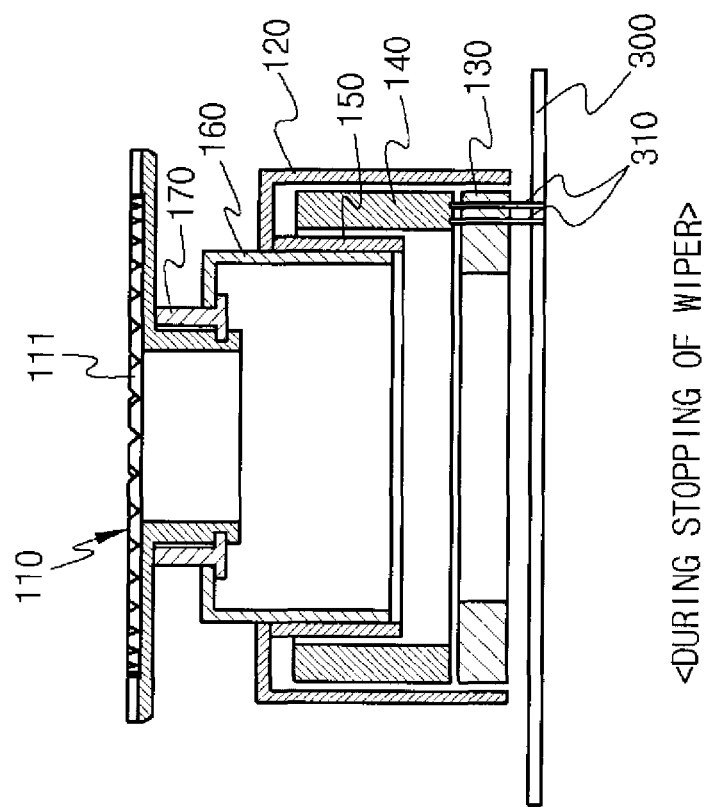

FIG. 1 is an exploded perspective view showing a direct drive motor including a fixing portion, FIG. 3 is a perspective view showing an appearance of a clutch in accordance with the preferred embodiment of the present invention, FIG. 4 is a cross-sectional view schematically showing the clutch in accordance with the preferred embodiment of the present invention, and FIG. 5 is a cross-sectional view showing the operation of the clutch in accordance with the present invention.

A direct drive motor in accordance with a preferred embodiment of the present invention includes a clutch as a means preventing a rotor from moving to forcibly fix a motor shaft.

As shown in FIG. 1, the direct drive motor (DDM), which operates in such a manner that the output of the motor is directly transmitted to a wiper arm, includes a rotating portion for generating a rotational force of the motor, an electronic control portion for controlling the rotating portion, a power transmitting portion for transmitting power generated by the rotating portion, and a fixing portion for restricting the operation of the rotating portion.

Figure 2:
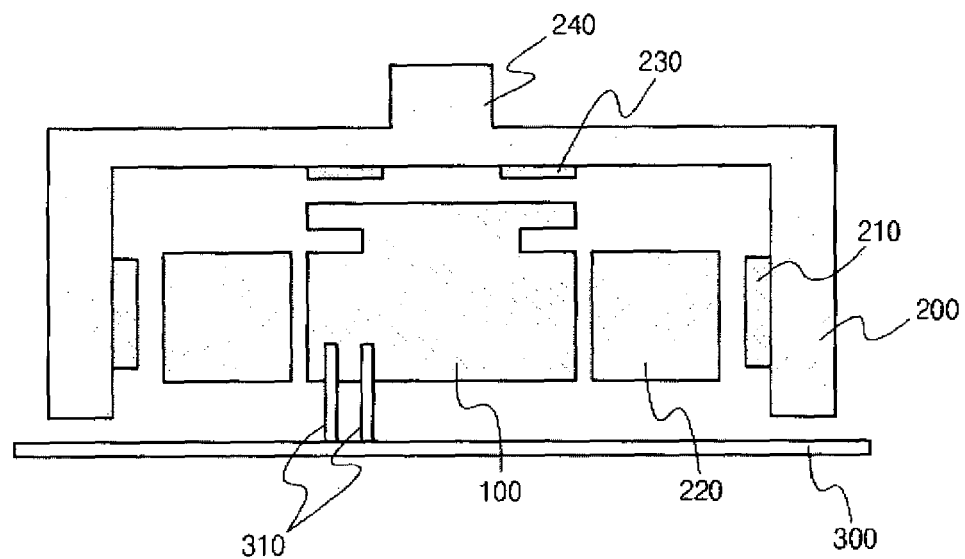
FIG. 2 is a cross-sectional view schematically showing a direct drive motor including a clutch in accordance with a preferred embodiment of the present invention.

FIG. 2 is an assembled cross-sectional view schematically showing the direct drive motor with the above-described configuration. The rotating portion includes a rotor 200 for generating the rotational force of the motor, a magnet 210 mounted on the inside of the rotor 200 and generating a magnetic force, and an armature 220 spaced from the magnet 210 in a predetermined distance. A sun gear 240 connected to the power transmitting portion and transmitting the rotational force of the rotor 200 is provided on an upper portion of the rotor 200, and a locking portion 230 engaged with the fixing portion is mounted on an upper inner surface on the rotor 200.

The electronic control portion includes a printed circuit board (PCB) 300 which supplies electrical power of appropriate polarity to the fixing portion through a terminal 310 according to an external environment, i.e., an operation state of the wiper.

The fixing portion includes the clutch 100 in accordance with present invention. As shown in FIGS. 3 and 4, the clutch 100 includes a wire 140 connected to the terminal 310 and receiving electrical power, a metal plate 150 wound by the wire 140 and magnetized by receiving a polarity from the wire 140, and a magnet 130 disposed at the bottom of the metal plate 150 to cause an attractive force and a repulsive force therebetween. The metal plate 150 and the magnet 130 are formed in the inner circumference of a cylindrical housing 120.

That is, when the PCB 300 supplies electrical power of positive (+) or negative (−) polarity to the wire 140 through the terminal 310, the metal plate 150 wound by the wire 140 has either N or S polarity.

Moreover, the clutch 100 includes an inner housing 160 connected to the inside of the metal plate 150 and operated integrally with the metal plate 150. The inner housing 160 is selectively moved up and down through an opening formed on an upper portion of the housing 120.

A cylindrical upper portion and a cylindrical lower portion are integrally formed on an upper portion of the inner housing 160, and an actuator 110 including a saw-toothed portion 111 corresponding to the locking portion 230 of the rotating portion is mounted on the upper portion of the inner housing 160 to be engaged with the locking portion 230. A lower portion of the actuator 110 penetrates the upper portion of the inner housing 160.

The actuator 110 is connected to the inner housing 160 with a hook 170 interposed therebetween. The hook 170 performs a hooking operation so that the actuator 110 is also moved up and down together with the inner housing 160 during moving up and down of the inner housing 160.

In the preferred embodiment of the present invention, although a plurality of metal plates 150 and a plurality of magnets 130 may be provided and mounted along the inner circumference of the housing 120, it is preferable that the metal plate 150 and the magnet 130 are formed with a cylindrical shape in which the upper and lower portions are opened so as to optimize the attractive force and repulsive force for moving up and down the actuator 110.

Next, the operation of the clutch in accordance with the present invention with the above-described configuration will be described.

When a control unit transmits an operation ON signal for the wiper, the PCB 300 detects the operation ON signal and generates electrical power of appropriate polarity to cause an attractive force between the magnet 130 and the metal plate 150. Then, the terminal 310 is operated to supply electrical power of the PCB 300 to the wire 140.

Then, an electric current flows in the wire 140, and thus the metal plate 150 has a polarity opposite to that of the magnet 130. As a result, an attractive force acts between the magnet 130 and the metal plate 150 such that the inner housing 160 having the metal plate 150 is moved down toward the magnet 130.

Accordingly, as shown in FIG. 5, the actuator 110 coupled to the inner housing 160 is also moved down together with the inner housing 160. As the actuator 110 is moved down, the saw-toothed portion 111 and the locking portion 230 are separated, and the rotor 200 of the rotating portion is free to rotate.

The rotor 200 is rotated by a repulsive force acting between the armature 220 and the magnet 210, and the thus generated rotational force is transmitted to the power transmitting portion by the sun gear 240 mounted on the upper portion of the rotor 200 to rotate the motor shaft. The rotational force of the motor shaft is directly transmitted to the wiper arm so that the wiper arm is driven.

Meanwhile, the rotor 200 is continuously rotated by the repulsive force between the armature 220 and the magnet 210. In order to stop the operation of the wiper, the control unit transmits an operation OFF signal for the wiper, and then the PCB 300 detects the signal and generates electrical power of appropriate polarity to cause a repulsive force between the magnet 130 and the metal plate 150.

At this time, since the magnet 130 has a constant polarity, the PCB 300 generates electrical power having a polarity opposite to that when the PCB 300 detects the operation ON signal for the wiper, and then the terminal 310 is operated to supply the electrical power to the wire 140.

Then, an electric current flows in the wire 140 in a direction opposite to that during operation of the wiper, and thus the metal plate 150 has the same polarity as the magnet 130, thus causing a repulsive force acts therebetween.

As a result, the inner housing 160 having the metal plate 150 is moved up, and the actuator 110 coupled to the inner housing 160 is moved up to the locking portion 230. Then, the saw-toothed portion 111 of the actuator 110 is engaged with the locking portion 230 to fix the rotor 200.

As a result, the motor shaft is fixed and, even if a user moves the wiper arm with his or her hand, the wiper is not moved.

As described above, the direct drive motor for a vehicle wiper system in accordance with the present invention, which includes the clutch for forcibly restricting the movement of the motor shaft, has the advantage in that it is possible to prevent the motor shaft from moving by fixing the rotor when the motor is moved by voluntary rotation of the rotor.

As a result, it is possible to prevent the vehicle wiper from moving by an externally applied force.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A direct drive motor for a vehicle wiper system, including a rotor for generating a rotational force, in which a sun gear connected to an upper portion of the rotor, transmits the rotational force to a power transmission portion, the direct drive motor comprising:
    a locking portion mounted on an upper inner surface of the rotor; and
    a clutch selectively engaged with the locking portion and preventing the rotor from moving;
    wherein the clutch comprises:
        a housing including an opening formed on an upper portion thereof;
        a metal plate provided on the inside of the housing and moved up and down;
        a wire formed on the metal plate and providing a polarity;
        a magnet provided in the operational direction of the metal plate and generating a magnetic force;
        an inner housing slidably coupled to the housing, connected to the metal plate and operated integrally with the metal plate; and
        an actuator including a saw-toothed portion, provided on an upper portion thereof, engaged with the locking portion, and mounted on the inner housing to be operated integrally with the inner housing.

2. The direct drive motor of claim 1, further comprising a hook mounted between the inner housing and the actuator and performing a hooking operation.

3. The direct drive motor of claim 1, wherein the wire is connected to a printed circuit board for supplying electrical power of appropriate polarity through a terminal.

4. The direct drive motor of claim 1, wherein at least one of the metal plate and the magnet is formed with a cylindrical shape along the inner circumference of the housing.

5. The direct drive motor of claim 1, wherein the clutch is operated by a magnetic force generated by electrical power applied thereto to restrict the operation of the locking portion.

6. A direct drive motor for a vehicle wiper system, including a rotor for generating a rotational force, in which a sun gear connected to an upper portion of the rotor, transmits the rotational force to a power transmission portion, the direct drive motor comprising:
- a locking portion mounted on an upper inner surface of the rotor; and
- a clutch selectively engaged with the locking portion and preventing the rotor from moving;
- wherein the clutch is operated by a magnetic force generated by electrical power applied thereto to restrict the operation of the locking portion; and
- wherein the clutch comprises:
  - a housing including an opening formed on an upper portion thereof;
  - a metal plate provided on the inside of the housing and moved up and down;
  - a wire formed on the metal plate and providing a polarity;
  - a magnet provided in the operational direction of the metal plate and generating a magnetic force;
  - an inner housing slidably coupled to the housing, connected to the metal plate and operated integrally with the metal plate; and
  - an actuator including a saw-toothed portion, provided on an upper portion thereof, engaged with the locking portion, and mounted on the inner housing to be operated integrally with the inner housing.

7. The direct drive motor of claim 6, further comprising a hook mounted between the inner housing and the actuator and performing a hooking operation.

8. The direct drive motor of claim 6, wherein the wire is connected to a printed circuit board for supplying electrical power of appropriate polarity through a terminal.

9. The direct drive motor of claim 6, wherein at least one of the metal plate and the magnet is formed with a cylindrical shape along the inner circumference of the housing.

10. A direct drive motor for a vehicle wiper system, the direct drive motor comprising:
- a rotating portion for generating a rotational force of the motor;
- a locking portion mounted to the rotating portion;
- a fixing portion configured to be selectively engaged with the locking portion and restricting the operation of the rotating portion; and
- an electronic control portion selectively controlling the rotating portion and the fixing portion,
- wherein the rotation portion comprises:
  - a rotor for generating the rotational force of the motor;
  - a magnet mounted on the inside of the rotor and generating a magnetic force; and
  - an armature spaced from the magnet in a predetermined distance,
- wherein the fixing portion inserted into the armature, comprises:
  - a housing inserted into the armature, wherein the housing includes an opening formed on an upper portion thereof;
  - an inner housing slidably inserted into the opening of the housing, wherein the inner housing is selectively moved up and down through an opening of the housing;
  - a wire positioned between the housing and the inner housing and connected to at least a terminal and receiving electrical power from the electronic control portion to provide a polarity;
  - a metal plate provided on the outer circumference of the inner housing and surrounded by the wire and selectively magnetized by receiving a polarity from the wire;
  - a magnet disposed substantially at the bottom of the metal plate to cause an attractive or repulsive force therebetween; and
  - an actuator provided on an upper portion of the inner housing.

11. The direct drive motor of claim 10, wherein a sun gear is coaxially provided on an upper portion of the rotor.

12. The direct drive motor of claim 10, wherein the locking portion is mounted on an upper inner surface on the rotor.

13. The direct drive motor of claim 10, wherein the electronic control portion includes a printed circuit board (PCB) which supplies electrical power of appropriate polarity to the fixing portion through at least a terminal according to an external environment, i.e., an operation state of the wiper and/or supplies electrical power to the rotation portion.

14. The direct drive motor of claim 10, wherein the actuator includes a saw-toothed portion configured to be selectively engaged with the locking portion.

15. The direct drive motor of claim 10, wherein at least one of the metal plate and the magnet is formed with a cylindrical shape along the inner circumference of the housing.

* * * * *